Patented Nov. 3, 1931

1,830,631

UNITED STATES PATENT OFFICE

WILLIAM R. E. ANDREWS, OF PHILADELPHIA, PENNSYLVANIA

PURE BACTERIAL CULTURE SPAWN

No Drawing. Application filed March 13, 1930. Serial No. 435,625.

The object of my invention is to produce a comparatively pure culture of bacteria, as of those found in unsterilized horse manure or like materials, which, when added to a mixture of the spores of the common mushroom (*Agaricus campestris*) and sterilized horse manure or like materials, aids in the development of a healthy growth of mycelium (known commercially as "spawn"). The beneficial action of such a culture on the development of the mycelium may be attributed to the decomposition of the organic matter into materials which are soluble and available for the nutrition of the mushroom, or to the synthesis of compounds by these bacteria which may be absorbed and utilized by the mushroom organism and which are practically indispensable to the latter. I have found by experiment, that no satisfactory development of the mycelium takes place in the absence of these bacteria, although germination of the spores may occur and a feeble non-commercial growth be had in the absence of these bacteria.

My object is also to produce a bacterial culture of the above character from mushrooms having therein a predominate number of these bacteria, and to utilize this culture for the commercial inoculation of a food material to which mushroom spores have been added, or to which they are subsequently added, and which later yields a product which may be used for the commercial production of mushrooms, on any scale desired.

My object is further to develop the desired bacterial culture from mushrooms which have been sterilized externally, and mixing same with mushroom spores and sterilized horse manure or like material, thereby increasing the development of bacteria and of the growth of the mushroom organism, the first stage of growth of which is germination followed by the development of mycelium.

My invention includes a commerical mushroom spawn when formed in horse manure, or like material, by inoculation thereof with mushroom spores and the desired bacterial culture made from mushroom material or from the source of material which supplies these organisms, with or without controlled incubation.

If the residual material of mushrooms which have been sterilized externally and finely divided under septic conditions, is treated with sterile water and incubated at about 30° centigrade, it will, in about forty-eight hours, show a pronounced development of a bacteria of relatively few species. These bacteria can assume a dormant state and it may be accepted that in part they normally assume this state or condition inside of the mushroom. These bacteria are believed necessary for mature development of the mushrooms, whereas other organisms found associated with these bacteria are harmful. Such organisms may be molds and other forms of micro-organisms.

To remove the molds and other forms of undesirable organisms, for the better isolation of the more desirable bacteria, the solution in contact therewith, may be treated with an acid reagent, and the molds and other undesirable organisms thereby partially if not wholly destroyed by a change in the reaction of the solution. Such an acidic addition may be acetic acid or like material.

Following the above procedure, as outlined or substantially so, the desirable bacterial culture from mushrooms may be developed having a relatively pure state, using, of course, ordinary or modified biochemical technique according to conditions existing; and the desirable culture of micro-organism thus isolated, may be further developed and improved by exercising the general technique such as employed in isolating the micro-organisms as above described. In the exercising of the process, no especial bacteriological method is required.

As herein before indicated, the object of my invention is, more particularly, to produce a comparatively pure culture of mushroom spawn, which includes mushroom spores and desirable bacteria obtained from within the mushroom or from a material which may yield these organisms and which conjointly, insure a healthy mycelial development of the mushroom in the presence of sterilized horse manure or like material.

To secure the necessary spores, a mushroom may be sterilized externally just before the veil thereof bursts, and the subsequent removal of the veil will permit the spores (corresponding to the seeds of higher plants) to be ejected in quantity and these may be collected on sterile medium or material, such as a sheet of paper, a glass surface or otherwise suitable material and introduced into distilled water, which may or may not have been sterilized, to form a suspension in which the spores may germinate. The spores may be suspended in water in this manner in order to facilitate handling.

If a suspension of these spores thus prepared, is added to sterile horse manure or like material, and further, is inoculated with the mushroom bacterial culture and kept under the proper conditions for development, a profuse growth of mycelium (spawn) will develop. Spawn of a commerical grade may therefore be developed by treating such a suspension of sterile spores in water (preferably distilled) with a portion of the mushroom culture, and then adding a suitable volume of the said mixture to the sterile manure or like material and incubating, all of which insures a condition in which germination and growth will take place and by reason of which spawn of a commercial grade will be produced.

If mushroom spores are introduced in sterile manure or like material, they will germinate but will not develop a healthy growth of mycelium; if, however, the desirable bacterial culture from mushrooms or from any other source is added, then and in that event alone, will a good mycelium development take place; a result of the action of the organism in the culture isolated from mushrooms or other desirable source, in that they break down the sterile manure and convert it into food material available for the freshly germinated spores and the subsequent mycelium development.

It will now be apparent that my invention resides more particularly in the special bacterial culture of the mushroom (*Agaricus campestris*) and method of producing the same under the conditions described. It does not synthesize these desirable bacterial organisms but obtains them from the material upon which they grow. The method of obtaining a culture of these organisms under the conditions above described and which by its use insures a healthy and satisfactory growth of mycelium of the mushroom plant, is an aid in the manufacture of a spawn to be used in the development of cultivated mushrooms.

I have described my improved method and product in that particularity which I deem to be the best exposition of my invention, and that which I prefer in commercial practice, but I do not restrict or confine myself to the minor or secondary details, as such are susceptible of modification, which may be resorted to as a matter of mechanical skill and without a departure from the spirit of the invention.

What I claim is:

1. The herein described method of producing a comparatively pure culture of mushroom spawn, which consists of treating sterile horse manure or like material with both a culture of bacteria obtained from mushrooms and mushroom spores, and producing thereby a profuse mycelial development of the mushroom.

2. The method stated in claim 1, wherein further, the bacterial culture from the mushroom is obtained by sterilizing the mushroom or host plant externally, subdividing the sterilized material of the mushroom and thereafter subjecting it to incubation in the presence of water sufficiently to induce a development therefrom of bacteria of relatively few species.

3. The method stated in claim 1, wherein further, the suspension of mushroom spores is provided by separating the spores from the host plant and treating them with water and temperature conditions to aid in their germination.

4. The method herein described, of producing a pure culture mushroom spawn, which consists in sterilizing the mushroom externally, sub-dividing the residual material, treating this material with water and incubating the materials so associated for a sufficient period to induce a development of bacteria of relatively few species in the form of a culture, also preparing a suspension of mushroom spores with water and allowing the spores to germinate, and treating sterilized manure with the bacterial culture thus obtained from the mushrooms and also the suspension of mushroom spores, and incubating the mixture to induce a favorable growth and development of mycelium, constituting the main vegetative phase of mushroom growth commercially called spawn.

5. The method of preparing a comparatively pure culture of bacteria from mushrooms, which consists in sterilizing the outside of a mushroom and sub-dividing the mushroom material, then treating the subdivided material with sterile water under septic conditions and incubating the materials at a temperature suitable for producing a pronounced development of the bacteria present in the mushroom.

6. The method described in claim 5, wherein further, the bacterial culture so produced is mixed with mushroom spores and sterilized manure or like material to provide a spawn suitable as a commercial product to be used for further promotion of mushroom growth.

7. The method for improving the growth of mushrooms which consists in separating from the mushrooms the spores thereof, treating the spores with water, sub-dividing the remaining portions of the mushroom and treating the same to incubation to facilitate the growth of bacteria therein, and subsequently mixing the bacterial culture of the mushroom so produced with the suspension of the spores in the presence of sterilized manure or like material.

8. The invention according to claim 7, wherein further, the treated manure with its increased bacterial content is utilized for inoculating further quantities of sterilized manure or its equivalent for the production of mycelial growth therein, and so on repeatedly.

9. The herein described method of producing a comparatively pure spawn culture which consists in treating a substance containing bacteria, as of those found in mushrooms, in a sub-divided condition with sterile water under septic conditions and incubating the materials at a temperature suitable for producing a pronounced development of the bacteria present, mixing the bacterial culture so produced with mushroom spores and sterilized manure to provide a spawn suitable as a commercial product for further promotion of mushroom growth.

10. As an article of manufacture, a mushroom spawn composed of a bacterial culture as of those found in mushrooms and germinated mushroom spores, associated with manure, and as a result of the admixture of the said bacterial culture and spores upon the manure.

11. As an article of manufacture, a commercial mushroom spawn composed of manure inoculated with mushroom spores and a desired bacterial culture as of those found in mushrooms.

In testimony of which invention, I hereunto set my hand.

WILLIAM R. E. ANDREWS.